Figure 1:
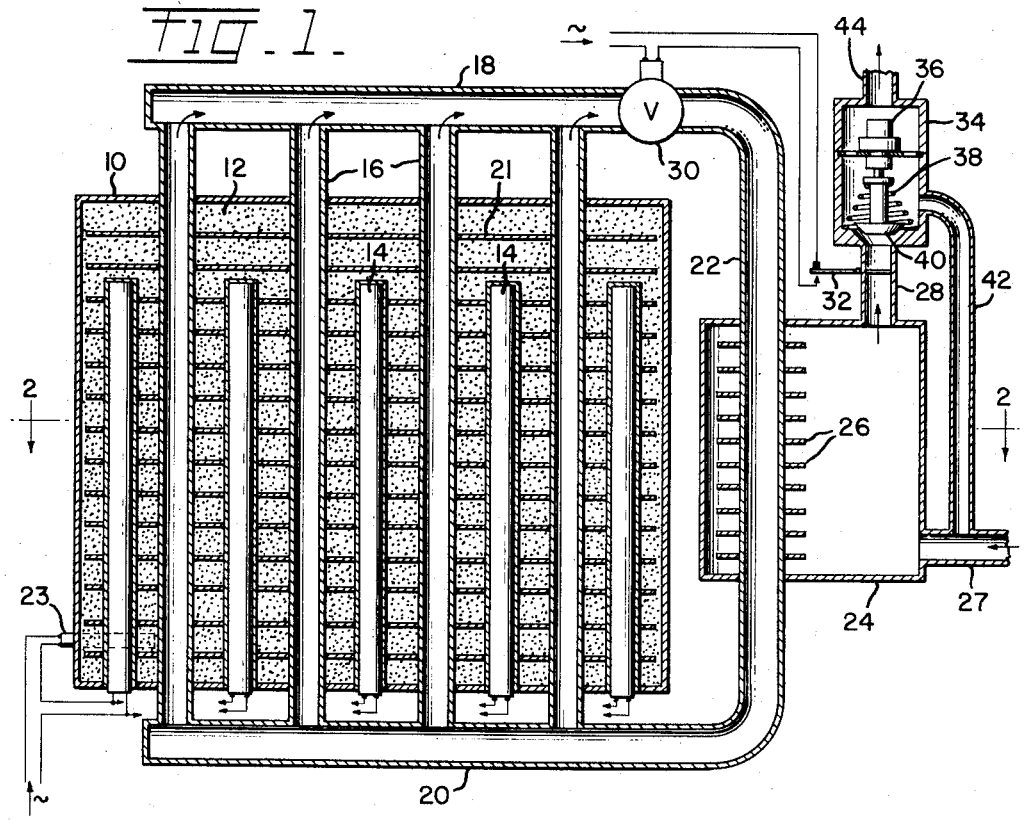

Nov. 3, 1959  C. D. MacCRACKEN  2,911,513
HEAT STORAGE WATER HEATER
Filed May 2, 1956  3 Sheets-Sheet 1

INVENTOR.
CALVIN D. MacCRACKEN
BY
James M. Relph
ATTORNEY

Nov. 3, 1959  C. D. MacCRACKEN  2,911,513
HEAT STORAGE WATER HEATER
Filed May 2, 1956  3 Sheets-Sheet 2

INVENTOR.
CALVIN D. MacCRACKEN
BY
James M. Relph.
ATTORNEY

Nov. 3, 1959
C. D. MacCRACKEN
2,911,513
HEAT STORAGE WATER HEATER
Filed May 2, 1956
3 Sheets-Sheet 3
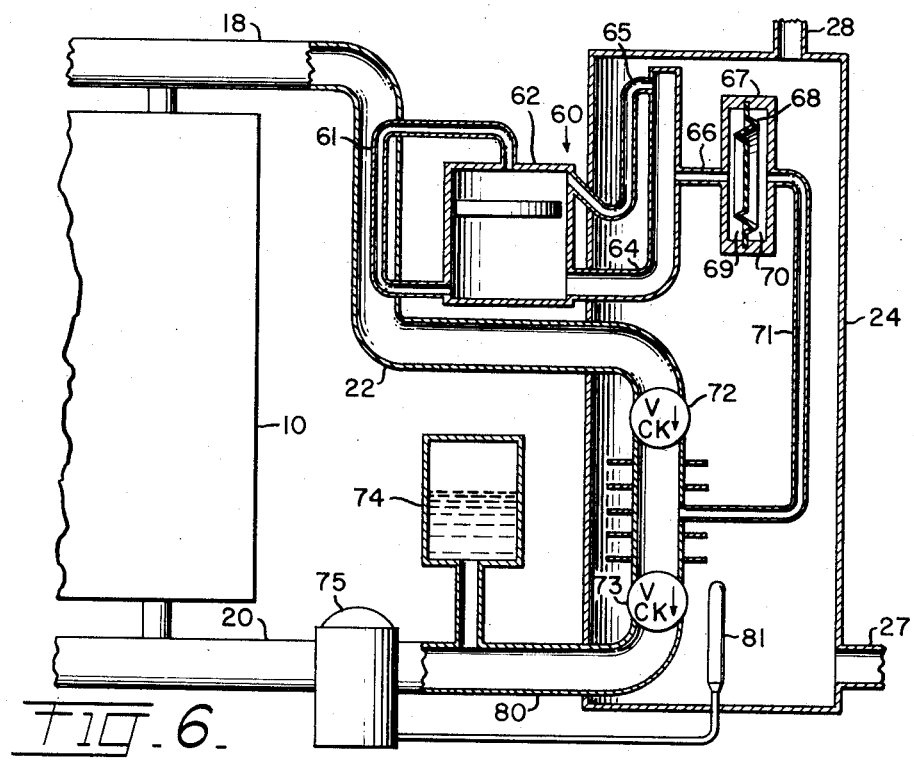
Fig. 6.
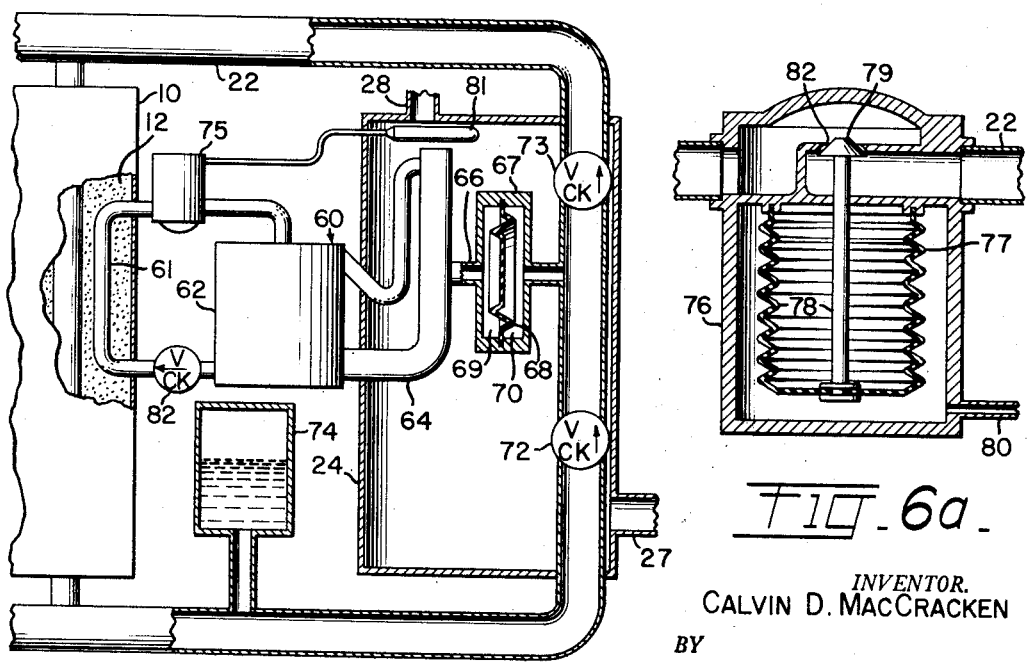
Fig. 7.
Fig. 6a.
INVENTOR.
CALVIN D. MacCRACKEN
BY
James M. Relph.
ATTORNEY United States Patent Office 2,911,513
Patented Nov. 3, 1959

2,911,513

HEAT STORAGE WATER HEATER

Calvin D. MacCracken, Tenafly, N.J., assignor to Jet-Heet, Inc., Englewood, N.J., a corporation of New York Application May 2, 1956, Serial No. 582,121

18 Claims. (Cl. 219—39)

This invention relates to improvements in water heaters, and particularly to an improved water heater of the type wherein heat is stored in an accumulator for transfer to the water as needed.

Conventional water heaters for supplying hot tap water are well known wherein a substantial quantity of water is heated in a storage tank and kept at the required temperature for withdrawal as required. In the usual case, the storage tank holds 30 to 60 gallons of water in order to insure an adequate supply as needed for domestic purposes. This, of course, requires a storage tank of considerable size, and with the advent of the wide variety of automatic household appliances requiring hot water, such as dishwashers, washing machines and the like, the capacity requirements and size of the storage tank have been increasing continuously. As a result, it is ordinarily impossible to locate the tank near the point where the hot water is actually needed, it being common practice to place the tank in a basement, utility room or the like where it takes up considerable space. In any case, such hot water supply arrangements involve a bulky, comparatively unsightly article, and also involve substantial heat losses in transferring the heated water from the storage tank to the points of use.

In the type of hot water heater described above, heat is stored or accumulated in the water itself at a relatively low rate over a period of time, and then can be withdrawn rapidly as needed.

Alternative proposals have been made for storing heat in some medium other than the water, such as a mass of metal, ceramic material, rock or the like. Although such arrangements overcome some of the disadvantages of the conventional hot water storage tank, it has still been necessary to have a relatively large storage device because of the limited amount of heat that could be stored per unit volume of heat storage material.

It is the general object of the present invention to provide an improved hot water heater which is relatively compact and which lends itself to being located at or near the point of actual use. A more specific object of the invention is the provision of an apparatus for storing relatively large quantities of heat in a comparatively small volume accumulator, and for transferring the stored heat to water as needed.

In accordance with a preferred embodiment of the invention, the foregoing and other related objects and advantages are obtained in a system wherein heat is stored at a relatively high temperature; substantially above the desired temperature of the liquid to be heated, such as water. An intermediate heat transfer liquid is utilized to transfer the heat from the relatively high temperature storage mass to the liquid to be heated in such a way that the latter never becomes overheated even when no liquid is being withdrawn from the system. This is accomplished by providing for heat transfer from the transfer medium to the liquid being heated on a proportional mass basis. In other words, a very small quantity of heat transfer medium at an elevated temperature is exposed to a relatively much larger quantity of the liquid to be heated so that the total heat transferred will not cause overheating when there is no flow through the system.

Figure 3:
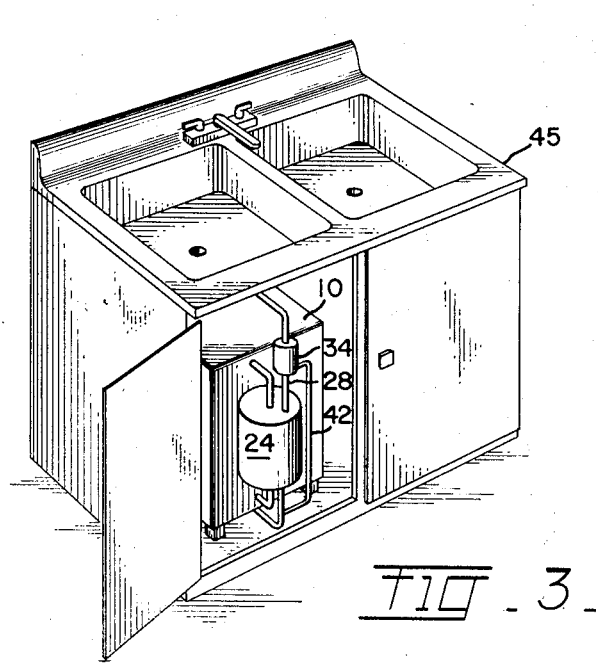
Figure 5:
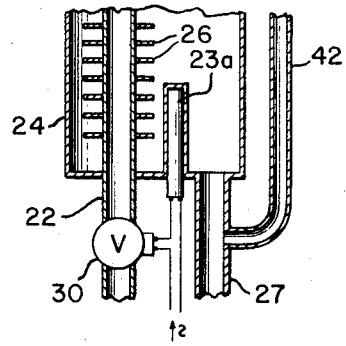
Figure 2:
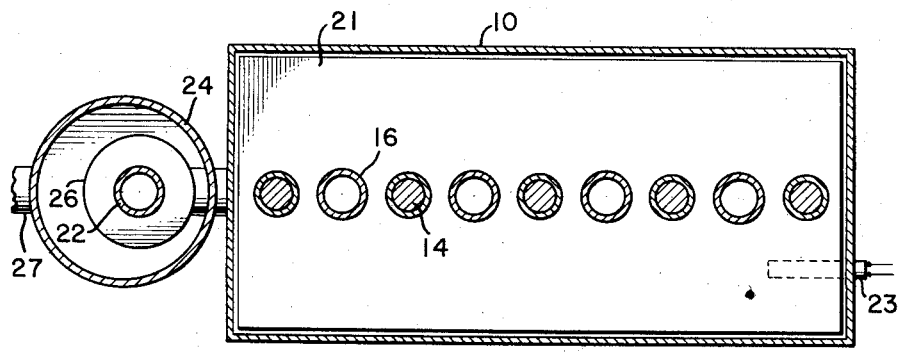
Figure 4:
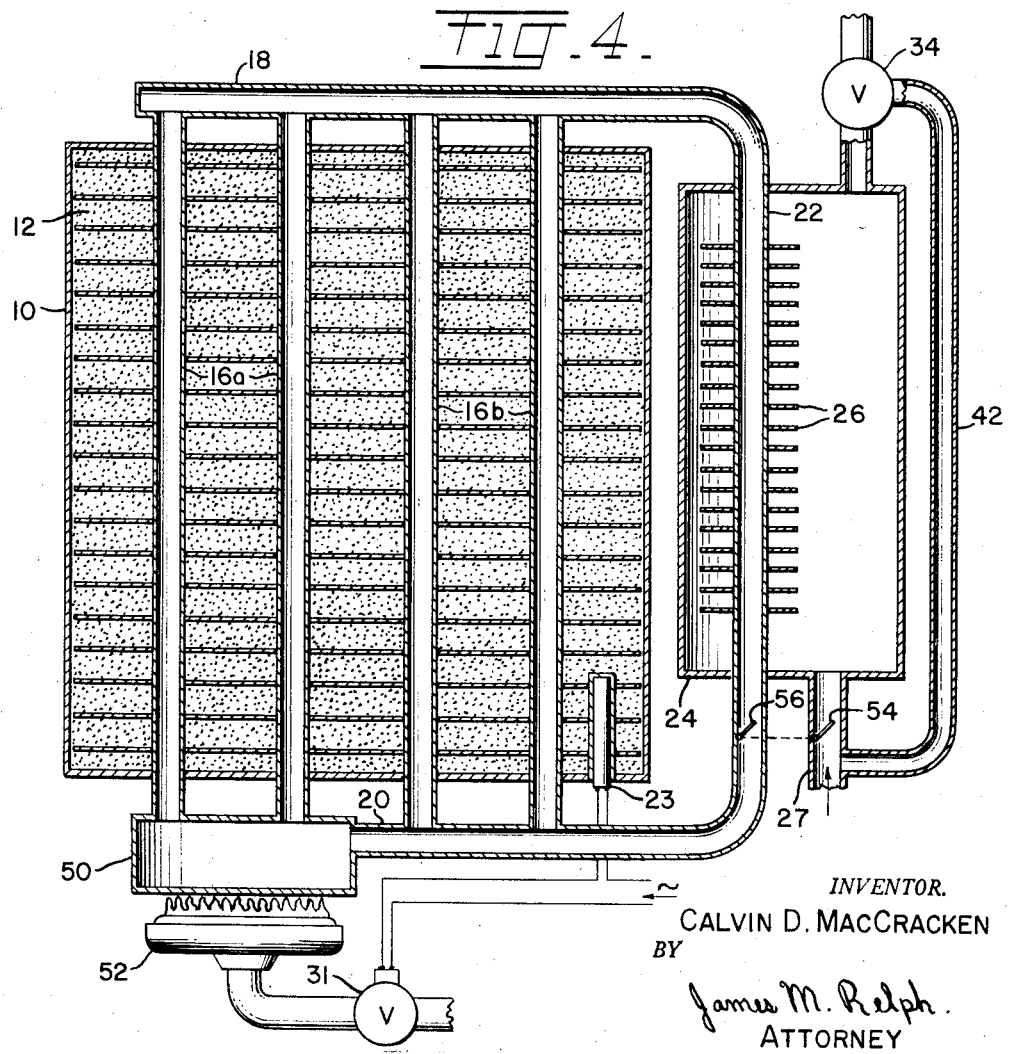

A more complete understanding of the invention, and of further objects and features thereof, can be had by reference to the following description of an illustrative embodiment of the invention, when considered in connection with the accompanying drawing, wherein Figure 1 is a sectional view of a water heater embodying the present invention, Figure 2 is a section view of the apparatus of Figure 1, taken on line 2—2 of Figure 1, Figure 3 is a perspective view of an installed water heater, Figure 4 is a section view of a modified form of the invention, Figure 5 is a partial sectional view of the heater tank showing an alternative flow control, and Figures 6, 6a and 7 illustrate a further alternative flow control comprising a heat actuated pump for inducing circulation in the intermediate fluid circuit.

It can be appreciated that it would ordinarily be impractical to store heat in any accumulator mass at a temperature appreciably above the boiling point of water, and then to transfer the stored heat directly into the water to be heated. The reason for this is that when no water is being withdrawn from the system, water which is standing in the accumulator would quickly become heated above its boiling point, developing dangerous pressures. This, of course, is the reason that prior art devices have been so large and bulky, in order to store enough heat at moderate temperatures. The present invention has its basis in the fact that a high temperature mass can be exposed directly to a given quantity of water without overheating the water, provided the total heat available in the high temperature mass is less than the amount required to raise the temperature of the given quantity of water above its boiling point.

By way of specific example, let it be assumed that five pounds of water at 160° F. is standing in a heat exchanger in heat exchange relationship with one pound of a different substance "X" at 400° F. Obviously, heat will flow from the higher temperature substance X to the water, and the water temperature will stabilize at some intermediate value which will depend both on the weight of the water and the weight of substance X, and their specific heats. Assume also that the specific heat of the X substance is ½ that of water. Then the temperature rise of the water will be proportional to the product of the specific heat and weight of the substance divided by the product of the specific heat and weight of the water. In the example under consideration, this relation is $$\frac{\tfrac{1}{2} \times 1}{1 \times 5}, \text{ or } \tfrac{1}{10}$$

Therefore, the temperature rise of the water would be ⅒ the temperature drop of the other substance. Since the temperature differential initially was 400 minus 160 or 240, the temperature rise of the water would be 240 divided by 11 or 21.8. This is entirely practical, since the final temperature of the water would not exceed 182 degrees.

With the foregoing in mind, consideration can be given to Figure 1 of the drawing, illustrating how the foregoing principle can be applied in a practical operating system embodying the present invention.

The apparatus shown in the drawing includes an accumulator structure 10 filled with a mass 12 of heat storage material. A particularly suitable type of material is an anhydrous crystalline solid which is dimorphic; that is, a solid which changes from one anhydrous crystalline form to another on the application of heat. A typical example of such a substance is anhydrous sodium sulfate. This salt will store .23 B.t.u.'s per pound per degree F. temperature rise, and in addition it will store about 100 B.t.u.'s per pound in making the transition from the rhombic to the hexagonal crystal form at about 450° F. Thus, 250 pounds of the material, which would occupy approximately 1.5 cu. ft., would store over 40,000 B.t.u.'s in being heated from a temperature of 200° F. to a temperature of 475° F. The reason for selecting these temperatures will be explained shortly. For the sake of concreteness, it will be assumed that the accumulator 10 is filled with 250 pounds of such salt. 40,000 B.t.u.'s heat storage capacity approximates that of a 50 gallon tank of the conventional hot water storage type, at a temperature differential of 100° F.

In order to supply heat to the accumulator 10, a plurality of electrical heating elements 14 are embedded in the salt material 12 at spaced locations, as shown in the drawing. These heating elements may take any one of a number of different forms, a suitable type being the well-known rod type, wherein a resistance wire is coiled within a seamless metal sheath and surrounded by a highly compacted refractory insulation.

A plurality of ducts 16 extend vertically through the heat accumulator 10, being connected in parallel between header tubes 18, 20 above and below the accumulator. In order to insure efficient heat transfer between the heating elements 14 and the salts 12, and between the salts 12 and the ducts 16, a plurality of plates 21 extend from side to side of the accumulator casing and are press-fitted or otherwise conductively contact the ducts 16 and the heating elements 14, to serve as heat-conducting fins.

A thermostatic switch element 23 extends into the body of salts and is connected in series with the circuit for the heaters, being adjusted to turn on the current to the heaters when the salt temperature is below 450° F. For simplicity, only one heater is shown connected, it being understood that the others are connected in parallel therewith.

The upper and lower headers 18, 20 are connected by a pipe 22 outside the accumulator. This pipe extends vertically through a tank 24 within which the heating of the water takes place. The portion of the pipe 22 inside the tank 24 preferably is provided with fins 26 to increase the heat transfer surface.

The tank 24 is provided with an inlet pipe 27 and an outlet pipe 28 for conducting water into and away from the tank 24. It should be understood that the tank 24 will be full of water at all times, whether or not water is actually flowing therethrough.

The circuit which includes the ducts 16, the headers 18, 20 and the outside pipe 22 (referred to collectively hereinafter as "the intermediate fluid circuit") is entirely filled with a liquid which will not boil at the maximum temperature of the storage material 12. In the case of the particular material previously referred to, a suitable liquid would be the liquid sold under the trade name "Dowtherm A," which is a mixture of diphenyl oxide and diphenal, and has a boiling point of about 496° F. at atmospheric pressure.

In the operation of the system as thus far described, heat will be supplied to the material 12 by means of the heater cartridges 14, thereby raising the salt temperature over the transition level of 450° F. This, of course, will raise the temperature of the heat transfer fluid to substantially the same level. However, a normally closed solenoid valve 30 in the intermediate fluid circuit will prevent the heat transfer liquid from flowing through the pipe 22. Accordingly, the water in the tank 24 will not be heated at this time.

A tiltable flow switch 32 is provided in the outlet duct 28 from the water tank 24, so arranged that when water flows through the outlet duct 28, a circuit will be completed through the flow switch 32 for actuating the solenoid valve 30 in the intermediate fluid circuit. Accordingly, when water is drawn from the tank 24, the flow switch 32 will operate to open the valve 30 in the intermediate circuit. This will permit gravity circulation to occur in this circuit in the direction shown by the arrows, bringing liquid at a temperature up to 475° F. into the finned heat exchange section of the tube 22, thereby to heat the water in the tank 24. This circulation will continue as long as water is withdrawn from the tank, providing a supply of heated water as required. Once the flow of water through the outlet duct 28 stops, the flow switch 32 will open, de-energizing the solenoid valve 30 and closing the circuit through the heat exchange tube 22.

At this time, a quantity of heat transfer liquid at 475° F. or lower will come to rest in the heat exchange section of the tube 22. While it is evident that some of this liquid will be at a lower temperature, for the sake of simplicity a uniform temperature of 475 will be assumed as representing the extreme condition. It will also be assumed that the tank 24 has a capacity of 5 pounds or 0.6 gallon of water, while the portion of the pipe 22 within the tank 24 will hold 1 pound of the transfer liquid, or about 0.14 gallon. Because of the greater volume of water contained in the tank as compared with the volume of liquid contained in the tube, the temperature of the water in the tank will only rise about 22 degrees as in the example previously given, stabilizing at a maximum temperature of 182° F. Thus, it will be evident that an arrangement has been provided whereby heat can be stored at a very high temperature in a relatively compact accumulator structure, and yet with no danger of overheating the water itself.

For a more general case, the relationship to be maintained can be expressed in terms of the following formula:

$$\frac{V_1}{V_2} > \frac{S_2 D_2 (t_2 - t_1)}{S_1 D_1 (t_1 - t_0)}$$

In the foregoing formula:

$S_1$ is the specific heat of the liquid to be heated (e.g.: water)
$S_2$ is the specific heat of the heat transfer liquid (e.g.: "Dowtherm A")
$V_1$ is the volume of tank 24
$V_2$ is the volume of pipe 22 within tank 24
$D_1$ is the density of the liquid to be heated
$D_2$ is the density of the heat transfer liquid
$t_0$ is the maximum temperature of the liquid to be heated
$t_1$ is the boiling temperature of the liquid to be heated
$t_2$ is the transition temperature of the heat storage material Since the temperature of the water in the tank 24 will vary considerably, it is preferable to have the tap water temperature controlled for uniformity. This can be accomplished readily by means of a conventional thermostatic mixing valve 34. A suitable type of valve comprises a thermally expansible element 36 located in a mixing chamber and operating against a spring 38 to control a valve 40 in the hot water line 28. A cold water line 42 connected to the supply line 27 is connected to discharge into the mixing chamber where the cold water will mix with hot water from the outlet 28, providing a constant temperature mixture in the line 44 leading to the tap (not shown).

It will be understood, of course, that the apparatus shown in Figure 1 can be arranged in a number of different ways to take advantage of the operating principle exemplified thereby. For example, an accumulator 10 measuring, say 1′ x 1′ x 1.5′ can be built into a kitchen unit underneath a sink 45 or the like, as shown in Figure 3, to provide a source of hot water immediately adjacent to the point of most frequent use. Other comparable installations, as in combinations with dishwashing or home laundry equipment, will suggest themselves readily to those skilled in the art.

In Figure 4 there is shown another embodiment of the invention wherein the heat is supplied by a gas or oil flame rather than by electrical heating means. In this case, the heat transfer medium serves the dual function of conveying heat from the flame to the storage salts and of extracting heat from the salts for transfer to the water when needed. To this end, a small reservoir or tank 50 may be provided beneath one section of the accumulator structure and above the heat source 52, in communication with the transfer liquid circuit. One set of accumulator ducts, 16a, extend from the tank 50 to the upper header 18. A second set of accumulator ducts, 16b, extend between the upper and lower headers 18, 20. With this arrangement, when heat is being supplied to the salts, gravity circulation will take place from the tank 50 upwardly through the riser tubes 16a and back down through the tubes 16b. On the other hand, when heat is being taken from the salts, the flow will be upward through all of the tubes 16a, 16b in the accumulator and down through the tube 22 in the water tank 24, as previously described. In this embodiment, the thermostatic sensing of salt temperature is utilized to turn on and off the fuel supply by means of a thermostat 23 in the salts and a solenoid valve 31 in the fuel line.

The apparatus of Figure 4 also includes an alternative form of flow control valve which is entirely mechanical, comprising a swing-type valve 54 in the water inlet line 26 linked mechanically to a similar valve 56 in the intermediate fluid circuit, whereby to allow circulation through the heat exchange tube 22 in the intermediate circuit when water is withdrawn from the tank 24 in the water circuit. As before, a thermostatic mixing valve 34 and associated cold water line 42 preferably is provided to insure constant tap water temperature.

In Figure 5 there is shown a control arrangement applicable either to the system of Figure 1 or the system of Figure 4 and which has several advantages over the control arrangements previously described. In this case, a thermostat switch element 23a is located in the tank 24 to sense the water temperature. This switch 23a is connected to control a solenoid-type valve 30 in the intermediate fluid circuit. Accordingly, when the temperature of the water in the tank 24 drops below the preselected level for which the thermostat 23a is set, the normally closed valve 30 will open, permitting gravity circulation of the intermediate fluid to heat the tank water. Of course, when water is drawn from the tank 24, the incoming cold water will actuate the thermostat to initiate heating fluid flow.

The Figure 5 control system has the advantage, among others, of eliminating the requirement for a mixing valve such as the valve 34 by sensing the temperature of the water in the tank 24 to maintain it at or near the preselected value. Furthermore, if no water is drawn from the tank 24 over a period of time, heat losses from the tank eventually will allow the water temperature to drop substantially. With the intermediate flow control systems of Figures 1 and 4, this would mean that some cool water would have to be drawn from the tank 24 before the tank would receive further heat. In the Figure 5 system, this difficulty is avoided as the tank temperature is automatically maintained at or above the preselected level at all times.

In accordance with a further embodiment of the invention, circulation of the heat transfer fluid can be increased to obtain a more rapid heating of the liquid to be heated by utilizing a heat actuated pump or thermopump. Figures 6, 6a and 7 show two arrangements for circulating the heat transfer liquid in this way.

Referring to Figure 6, there is shown a heat accumulator 10 which may be either electrically or flame heated as in Figures 1 or 4. The pipe 22 which connects the header pipes 18, 20 extends through a tank 24 within which heat is transferred to the liquid to be heated, as in the previously described embodiments of the invention. For simplicity, the inlet and outlet pipes 27, 28 only are shown, omitting the mixing valve and related parts.

To provide for positive circulation of the liquid through the pipe 22, a heat actuated pump or thermopump 60 is connected into the system. The thermopump 60 comprises a generator tube 61 which extends into the tube 22 upstream of the tank 24 in heat exchange relation with the liquid contained in the tube 22. The generator tube 61 is connected at its upper and lower ends to a vapor collecting cylinder 62, which is connected at its lower end to a condensing cylinder 64 contained within the tank 24. A U-shaped vapor tube 65 extends downwardly from the upper part of the vapor collecting cylinder 62, and then upwardly to the condensing cylinder 64. The condenser 64 is connected by a tube 66 to a diaphragm housing 67. The housing 67 is divided by a flexible diaphragm 68 into first and second compartments 69, 70, respectively. The tube 66 connects the pump condenser 64 to the compartment 69, while a further pipe 71 connects the other compartment 70 to the tube 22 within the tank 24. Upstream and downstream, respectively, of the tube 71, the pipe 22 contains a pair of check valves 72, 73, for a purpose to be explained shortly.

When the system is prepared for operation, the entire space inside the generator 61, the collector 62, the condenser 64, and the chamber 69, together with the tubes 65, 66, will be filled with a liquid which boils at a temperature below the boiling temperature of the intermediate heat transfer liquid and above the boiling temperature of the liquid to be heated in the tank 24. For example, in a case where the intermediate heat transfer liquid comprises Dowtherm A and the liquid to be heated comprises water, the liquid filling the pump portion of the system may be glycol and water, which has a boiling point at atmospheric pressure of between 212° F. and 386° F., depending on the proportion of glycol and water used.

Assuming, for the moment, that the liquid surrounding the generator tube 61 is at a temperature above the boiling point of the liquid contained in the pump 60, boiling will occur within the tube 61, and vapor will collect in the upper portion of the tube 61. As boiling continues, the collected vapor will begin to accumulate both in the upper portions of the generator 61 and in the collector 62. As the vapor collects, it will displace liquid from the generator 61 and the collector 62, forcing liquid flow through the condenser 64 and the tube 66 into the chamber 67. This will cause the diaphragm 68 to flex toward the right as viewed in the drawing, forcing liquid out of the chamber 70 and through the pipe 71. Since no liquid can flow through the valve 72 from the pipe 71, it must all flow through the valve 73 toward the heat accumulator 10.

The foregoing action will continue, with the liquid level dropping in the generator 61, the collector 62, and the section of the vapor tube 65 which extends downwardly from the collector 62, until the liquid level reaches the lowermost point in the vapor tube 65.

Up to this time, the pressure exerted by the vapor on the liquid surface in the pump will balance the head pressure exerted by the column of liquid standing in the condenser 64. However, once the vapor in the vapor tube 65 passes the lowermost part of the U, the head pressure exerted by the foregoing column of liquid will no longer be supported by the vapor pressure, since the vapor will be free to pass upwardly through the vapor tube. Once this action starts, liquid will flow into the vapor collector 62 from the condenser 64, forcing vapor ahead of it out the collector 62 and through the vapor tube 65 into the condenser where it will condense rapidly due to the relatively cooler liquid contained in the tank 24. This will immediately lower the pressure in the pump 60, causing the diaphragm 68 to flex toward the left as viewed in the drawing, to replace the volume occupied by the vapor before condensation. In turn, this will draw liquid into the chamber 70 through the tube 71, which will cause liquid to flow through check valve 72 into the pipe 71. As soon as the pump 60 has completely refilled, vapor will again start to collect in the generator 61 and collector 62, and the cycle will repeat.

From the description given thus far, it can be seen that some expansion space is required in the system to take up the volume changes which occur upon alternate vaporization and condensation of liquid in the pump 60. For this purpose, an expansion chamber 74 is provided just outside the tank 24 and in communication with the pipe 22, providing a quantity of air above the liquid level in the chamber 74 which can be compressed as the pump 60 forces liquid through the check valve 73.

In the embodiment of the invention presently being described, the means for turning on and off the flow of liquid through the pipe 22 comprises a thermostatically controlled valve 75 which is located in the pipe 20 between the expansion chamber 74 and the heat accumulator 10. While the valve 75, may, for example, be of the conventional solenoid control type previously referred to in connection with Figures 1–5, it may also comprise a pressure actuated valve as shown in detail in Figure 6a.

The valve in Figure 6a comprises a pressure-tight housing 76 containing a bellows 77 which is connected by a stem 78 to a valving member 79. The housing 76 is connected by a capillary tube 80 to a bulb 81 located within the tank 24 where it will sense the temperature of the liquid in the tank 24. The bulb 81 contains a small quantity of vaporizable fluid such as alcohol, ether or the like which will vaporize at a preselected temperature and build up a pressure inside the housing 76 which will compress the bellows 77 to drive the valving member 79 against its seat 82. Thus, when the temperature of the liquid in the tank 24 is below the preselected value, the valve 79 will be open, permitting liquid flow through the pipe 22 and associated parts of the intermediate fluid circuit.

When the system is first put in operation, some thermogravitational flow will take place through the intermediate fluid circuit including the pipe 22. This will bring hot liquid from the heat accumulator 10 over into that portion of the pipe 22 which surrounds the pump generator 61. The first time that the temperature of the liquid in the tank 24 comes up to the value at which the valve 75 will close, there will be enough hot liquid in the pipe 22 to force the pump 60 to go through at least one vaporization cycle. The result of this will be to build up pressure in the expansion chamber 74, since the liquid cannot escape either through the valve 73 or through the valve 75. Before the liquid in the tank 24 cools sufficiently to cause the valve 75 to open again, the pressure will have dropped inside the pump 60 due to condensation of vapor therein, so that the pump will be in condition to draw in liquid as soon as any liquid supply is available. Accordingly, when the valve 75 is opened, liquid will flow out of the chamber 74 under pressure and through the intermediate fluid circuit, bringing hot liquid around to the pump generator 61 and getting the system into operation very quickly.

An alternative arrangement of the thermopump is illustrated in Figure 7 of the drawing. In this case, the generator 61 of the pump 60 is located inside the heat accumulator 10 in the heat storage material 12, rather than being located in the pipe 22 as in the system shown in Figure 6. Also, in Figure 7, the thermostatic valve 75 is located between the generator 61 and the vapor collector 62. As before, the bulb 81 of the capillary for the valve 75 is located within the tank 24 to sense the temperature of the liquid therein. To prevent reverse liquid flow from the generator 61, a check valve 82 is placed between the lower end of the generator 61 and the lower end of the collector 62.

The system in Figure 7 will operate substantially the same as that shown in Figure 6, with the exception that, when the temperature of the liquid in the tank 24 is high enough to stop the circulation of liquid through the pipe 22, the valve 75 between the pump generator and the pump vapor collector will close, interrupting the flow of vapor to the collector. As a result, the pressure inside the generator will build up to the level determined by the temperature of the storage material 12, because no vapor can pass the thermostatic valve 75 and no liquid can leave the generator due to the generator inlet check valve 82. In order to prevent any thermogravitational circulation of liquid through the intermediate fluid circuit, it is preferable in this embodiment of the invention to have the check valves in the pipe 22 oriented to permit flow upwardly only through the pipe 22. Otherwise, the liquid in the tank 24 might become overheated. When heat is called for at the tank 24, the valve 75 will open, starting immediate circulation of the heat transfer fluid due to operation of the pump 60 as previously described.

What is claimed is:

1. In a liquid heating apparatus, in combination, a heat exchanger having a passage of predetermined volume through which to circulate a liquid to be heated, a heat accumulator containing a material adapted to absorb and release relatively large amounts of heat with negligible temperature change at a predetermined temperature substantially above the boiling temperature of said liquid, a fluid conduit extending through said accumulator in heat exchange relation with said material and having outside said accumulator and in heat exchange relation with said passage a portion of preselected volume, said conduit forming a closed fluid circuit, a heat-transfer fluid filling said circuit, means associated with said accumulator for heating said material, and means for controlling fluid flow in said circuit, said volumes and said liquid and said fluid being such as to satisfy the relation $$\frac{V_1}{V_2} > \frac{S_2 D_2 (t_2 - t_1)}{S_1 D_1 (t_1 - t_0)}$$

where $V_1$—said predetermined volume
$S_1$—specific heat of said liquid
$D_1$—density of said liquid
$S_2$—specific heat of said heat transfer fluid
$D_2$—density of said heat transfer fluid
$V_2$—said preselected volume
$t_2$—said predetermined temperature
$t_1$—boiling temperature of said liquid
$t_0$—maximum temperature of said liquid 2. The invention defined in claim 1, wherein said conduit comprises a plurality of parallel tubes extending through said accumulator, and heat conductive plates extending from said tubes throughout said material to conduct heat between said tubes and said material.

3. The invention defined in claim 1, wherein said heating means comprises a plurality of electrical heating elements embedded in said material at spaced points therein.

4. The invention defined in claim 1, wherein said heating means comprises a reservoir included in said closed fluid circuit, and a fluid fuel burner adjacent to said reservoir for heating said fluid.

5. The invention defined in claim 1, wherein said fluid flow control means comprises a solenoid valve in said fluid circuit, and a thermostatic switch connected to control said solenoid valve and in heat exchange relation to said passage for sensing the temperature of the liquid in said passage.

6. The invention defined in claim 1, including a cool liquid inlet to said heat exchanger passage, a hot liquid outlet from said passage, a bypass line from said inlet to said outlet bypassing said heat exchanger, and a thermostatic mixing valve at the junction of said bypass line and said outlet for adjusting the proportions of hot and cold liquid passing through said valve.

7. The invention defined in claim 1 wherein said conduit is disposed substantially vertically in said material to induce gravitational liquid flow through said conduit.

8. The invention defined in claim 1, including temperature-sensing control means disposed in temperature sensing relation to said material and arranged to control said heating means in response to changes in the temperature of said material.

9. The invention defined in claim 1, wherein said fluid flow control means comprises a normally closed valve in said circuit, and means coupled to said valve for opening said valve in response to flow of said liquid through said heat exchanger passage.

10. The invention defined in claim 1, wherein said means for controlling fluid flow in said circuit comprises a heat actuated pump unit comprising a vaporizer within which to vaporize liquid by heating, a condenser within which to condense vaporized liquid, and means connecting said vaporizer and said condenser through which to transfer liquid and vapor therebetween, said vaporizer being arranged to receive heat from said heating means.

11. The invention defined in claim 10, wherein said vaporizer is located within said fluid conduit.

12. The invention defined in claim 10, wherein said vaporizer is located in heat exchange relation with said material.

13. In a liquid heating apparatus, in combination, a heat exchanger having a passage through which to circulate a liquid to be heated, a heat accumulator containing a material adapted to absorb and release relatively large amounts of heat with negligible temperature change at a predetermined temperature substantially above the boiling temperature of said liquid, a fluid circuit comprising a conduit extending through said accumulator in heat exchange relation with said material and having a portion outside said accumulator and in heat exchange relation with said passage, a heat transfer fluid filling said circuit, means associated with said accumulator for heating said material, and means for circulating said fluid in said circuit, said circulating means comprising a heat actuated pump unit comprising a vaporizing section within which to vaporize liquid by heating, a condenser section within which to condense vaporized liquid and coupling means connecting said sections to transfer liquid and vapor therebetween, coupling means connecting said pump unit to said fluid circuit to transfer pumping impulses from said pump unit to said fluid circuit, an accumulator tank communicating with said fluid circuit for absorbing pulsations in the liquid flow in said fluid circuit, and means for transferring heat from said heating means to said vaporizing section of said pump unit.

14. The invention defined in claim 13 wherein said second-named coupling means comprises a conduit having a diaphragm element therein separating the liquid in said pump unit from the liquid in said circuit.

15. In a liquid heating apparatus, in combination, a heat exchanger having a passage through which to circulate a liquid to be heated, a heat accumulator containing a material adapted to absorb and release relatively large amounts of heat with negligible temperature change at a predetermined temperature substantially above the boiling temperature of said liquid, a fluid circuit comprising a conduit extending through said accumulator in heat exchange relation with said material and having a portion outside said accumulator and in heat exchange relation with said passage, a heat transfer fluid filling said circuit, means associated with said accumulator for heating said material, and means for circulating said fluid in said circuit, said circulating means comprising a heat actuated pump unit comprising a vaporizing section within which to vaporize liquid by heating, a condenser section within which to condense vaporized liquid and coupling means connecting said sections to transfer liquid and vapor therebetween, coupling means connecting said pump unit to said fluid circuit to transfer pumping impulses from said pump unit to said fluid circuit, means including said material for transferring heat from said heating means to said vaporizing section of said pump unit, and thermostatic control means for controlling liquid flow in said circuit, said control means including a temperature sensing element located in said heat exchanger passage.

16. The invention defined in claim 15, wherein said control means includes a valve in said circuit.

17. The invention defined in claim 15, wherein said control means includes a valve in said first-named coupling means.

18. In a liquid heating apparatus, the combination including a heat exchange passage through which to pass a liquid to be heated, a heat accumulator containing a material adapted to absorb and release relatively large amounts of heat with minor temperature change at a predetermined temperature substantially above the boiling temperature of said liquid, means to heat said accumulator and said material to a temperature above said predetermined temperature whenever the material temperature falls a substantial amount below said predetermined temperature, a conduit containing fluid which will not boil at said predetermined temperature and extending through said accumulator in heat exchange relationship with said material and extending outside said accumulator in heat exchange relationship with said passage, said conduit forming a closed fluid circuit, and means to control the amount of said fluid in heat exchange relationship with said passage to maintain said liquid heated within a temperature range below its boiling point.

References Cited in the file of this patent

UNITED STATES PATENTS

| | | |
|---|---|---|
| 1,027,970 | Allen | May 28, 1912 |
| 1,069,949 | Hassler | Aug. 12, 1913 |
| 1,790,555 | Plumb | Jan. 27, 1931 |
| 1,892,557 | McCormick | Dec. 27, 1932 |
| 2,245,967 | Dillon | June 17, 1941 |
| 2,338,691 | Tucker | Jan. 4, 1944 |
| 2,808,494 | Telkes | Oct. 1, 1957 |